US012244997B2

(12) United States Patent
Sun et al.

(10) Patent No.: US 12,244,997 B2
(45) Date of Patent: Mar. 4, 2025

(54) ADAPTIVE ACTIVE NOISE CONTROL SYSTEM WITH HEARING ASSISTANCE MECHANISM

(71) Applicant: Google LLC, Mountain View, CA (US)

(72) Inventors: Guohua Sun, Santa Clara, CA (US); Leng Ooi, San Jose, CA (US); Jae Lee, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 51 days.

(21) Appl. No.: 17/768,667

(22) PCT Filed: Sep. 16, 2020

(86) PCT No.: PCT/US2020/050998
§ 371 (c)(1),
(2) Date: Apr. 13, 2022

(87) PCT Pub. No.: WO2022/060354
PCT Pub. Date: Mar. 24, 2022

(65) Prior Publication Data

US 2022/0417647 A1 Dec. 29, 2022

(51) Int. Cl.
*H04R 1/10* (2006.01)
*G10K 11/178* (2006.01)
*H04R 25/00* (2006.01)

(52) U.S. Cl.
CPC ..... *H04R 1/1083* (2013.01); *G10K 11/17881* (2018.01); *H04R 1/1041* (2013.01); *H04R 25/505* (2013.01)

(58) Field of Classification Search
CPC .. H04R 1/1083; H04R 1/1041; H04R 25/505; G10K 11/17881

(Continued)

(56) References Cited

U.S. PATENT DOCUMENTS

| | | | | |
|---|---|---|---|---|
| 10,034,092 | B1 * | 7/2018 | Nawfal | H04R 5/04 |
| 2006/0002574 | A1 * | 1/2006 | Shennib | H04R 25/505 381/321 |

(Continued)

FOREIGN PATENT DOCUMENTS

| | | |
|---|---|---|
| CN | 105764018 B | 7/2019 |
| EP | 2793118 A1 | 10/2014 |

(Continued)

OTHER PUBLICATIONS

"Foreign Office Action", EP Application No. 20781247.0, Jul. 4, 2023, 4 pages.

(Continued)

*Primary Examiner* — William A Jerez Lora
(74) *Attorney, Agent, or Firm* — Colby Nipper PLLC

(57) ABSTRACT

The present disclosure provides systems and method for adjusting the audio output of a wearable device based on an audio gain profile of a user. The wearable device may receive an audiogram indicating one or more frequency ranges associated with hearing loss. The wearable device may determine the audio gain profile based on the audiogram. The wearable device may use one or more adjustment modules to determine a gain to apply to the audio output based on the audio gain profile. The adjustment modules may include an active noise control module, a hearing assistance module, and a transparency control module. The wearable device may determine the amount of gain to apply using a least mean square algorithm and/or a machine learning model.

20 Claims, 4 Drawing Sheets

(58) Field of Classification Search
USPC ... 381/23.1, 71.1, 71.14, 94.2, 94.3, 98, 312
See application file for complete search history.

(56) References Cited

U.S. PATENT DOCUMENTS

| | | | | |
|---|---|---|---|---|
| 2015/0049876 | A1 | 2/2015 | Kim et al. | |
| 2015/0063614 | A1* | 3/2015 | Petersen | H04R 25/30 381/318 |
| 2015/0063615 | A1* | 3/2015 | Park | H04S 7/304 381/321 |
| 2015/0281853 | A1 | 10/2015 | Eisner et al. | |
| 2019/0045293 | A1* | 2/2019 | Blau | A61B 5/0004 |
| 2019/0320268 | A1 | 10/2019 | Blau et al. | |
| 2020/0077204 | A1 | 3/2020 | Pedersen et al. | |
| 2020/0204936 | A1 | 6/2020 | Mathurine et al. | |
| 2020/0382859 | A1* | 12/2020 | Woodruff | H03G 3/3005 |
| 2021/0274294 | A1* | 9/2021 | Lunner | H04R 25/505 |

FOREIGN PATENT DOCUMENTS

| | | | |
|---|---|---|---|
| KR | 20080096988 | A | 11/2008 |
| WO | 2018209406 | A1 | 11/2018 |

OTHER PUBLICATIONS

"International Preliminary Report on Patentability", Application No. PCT/US2020/050998, Mar. 21, 2023, 7 pages.

International Search Report and Written Opinion for International Application No. PCT/US2020/050998 dated Jun. 9, 2021. 13 pages.

"Foreign Office Action", EP Application No. 20781247.0, Jan. 10, 2025, 5 pages.

"Foreign Office Action", CN Application No. 202080082429.3, Dec. 17, 2024, 15 pages.

* cited by examiner

300

ADAPTIVE ACTIVE NOISE CONTROL SYSTEM WITH HEARING ASSISTANCE MECHANISM

CROSS-REFERENCE TO RELATED APPLICATIONS

The present application is a national phase entry under 35 U.S.C. § 371 of International Application No. PCT/US2020/050998, filed Sep. 16, 2020, published in English, which is incorporated herein by reference.

BACKGROUND

Wearable and bearable devices may include an active noise control system that generates noise cancellation signals based on microphone inputs. The microphone inputs are filtered using a digital signal processing engine that generates sound waves. The sound waves are superimposed with the primary sound wave within a user's ear. This may isolate and remove the ambient noises. However, active noise control typically does not provide hearing assistance for users with mild to moderate hearing loss.

BRIEF SUMMARY

The present disclosure provides systems and methods for adaptively adjusting the audio output to provide a user with a more natural listening experience. A wearable device may receive an audiogram from another device indicating a frequency range associated with hearing loss. The wearable device may create an audio gain profile based on the audiogram. The audio gain profile may be based on the one or more frequencies in the audiogram and may include information identifying whether a positive or negative gain should be applied to the indicated frequencies. The wearable device may include one or more adjustment modules that may apply a gain to the identified frequency ranges based on the audio gain profile. Use of such adjustment modules allow for personalizing a wearable or hearable device, e.g., an ear bud, to a given user. It also allows for dynamic adjustment of the gain profile to compensate for changes in the audiogram, sound in the surrounding environment or changes to a desired sound.

One aspect of the disclosure includes a wearable device comprising one or more microphones and one or more processors in communication with the one or more microphones. The one or more processors may be configured to receive an audiogram including a frequency range associated with hearing loss of a user, determine, based on the audiogram, an audio gain profile, receive, from the one or more microphones, audio content including at least one of external audio and playback audio, and adjust, based on the audio gain profile and the received audio content, an audio output.

The audio gain profile may include a positive gain or a negative gain for at least one frequency range. The audio gain profile may include at least one positive gain for the frequency range associated with hearing loss. The audio gain profile may be based on one or more frequency ranges in the audiogram.

The one or more processors may be further configured to adjust the audio output using an adaptive hearing block. When adjusting the audio output using the adaptive hearing block the one or more processors may be further configured to determine, using a least mean square algorithm, a gain for the frequency range. The adaptive hearing block may include at least one of noise cancellation, acoustic transparency control, and hearing assistance. The one or more processors may be further configured to periodically receive one or more updated audiograms, and update the audio gain profile based on the one or more updated audiograms.

Another aspect of the disclosure includes a method comprising receiving, by one or more processors, an audiogram including a frequency range associated with hearing loss, determining, by the one or more processors based on the audiogram, an audio gain profile, receiving, from one or more microphones in communication with the one or more processors, audio content including at least one of external audio and playback audio, and adjusting, by the one or more processors based on the audio gain profile and the received audio content, an audio output.

Yet another aspect of the disclosure includes a non-transitory computer-readable medium storing instructions, which when executed by one or more processors, cause the one or more processors to receive an audiogram including a frequency range associated with hearing loss, determine, based on the audiogram, an audio gain profile, receive, from one or more microphones, audio content including at least one of external audio and playback audio, and adjust, based on the audio gain profile and the received audio content, an audio output.

DETAILED DESCRIPTION

A wearable device may include a hearing assistance mechanism to provide a natural frequency-dependent enhancement of sound for users with mild to moderate hearing loss. The wearable device may be earbuds, smart glasses, AR/VR headsets, helmets, etc. The wearable device may receive content from a host device. For example, the wearable device may receive an audiogram indicating one or more frequency ranges associated with hearing loss. The device may also receive audio content streaming from the host device for output to the user.

The audiogram may be received by an adaptive hearing control ("AHC") block of the wearable device. Based on the audiogram, the AHC block may create an audio gain profile indicating frequency ranges which may require a positive gain or a negative gain to provide the user with a more natural listening experience. The audio gain profile may be used to determine an adjustment to be made to audio output to compensate for mild to moderate hearing loss. The audio gain profile may indicate certain a certain amount of gain for given frequency ranges in which a user experiences hearing loss. The gain for a given frequency range may compensate for the hearing loss. In some examples, there may be a different audio gain profile for each ear. For example, the right ear and the left ear may experience different or varying degrees of hearing loss. The right ear may have moderate hearing loss while the left ear has mild hearing loss. In some examples, the frequency ranges in which an audiogram indicates hearing loss may be different for each ear. Thus, the audio gain profile for the right ear may be different than the left ear. In other examples, using a host device (e.g., smart phone) and wearable device (e.g., ear bud), an audiogram may be periodically generated and used to adjust the gain profile of the wearer of the wearable device.

The AHC block may include an active noise control system ("ANC"), and a hearing assistance control mechanism ("HAC"), and a transparency control system ("XPC"). The AHC may automatically adapt, or adjust, audio output based on input received by one or more microphones and the audio gain profile. The AHC block may adjust the audio output based on a least mean square algorithm. In some examples, the least mean square algorithm may determine the amount of gain that should be applied by each adjustment module. Additionally or alternatively, the AHC block may adjust the audio output based on a machine learning model.

Figure 1A:
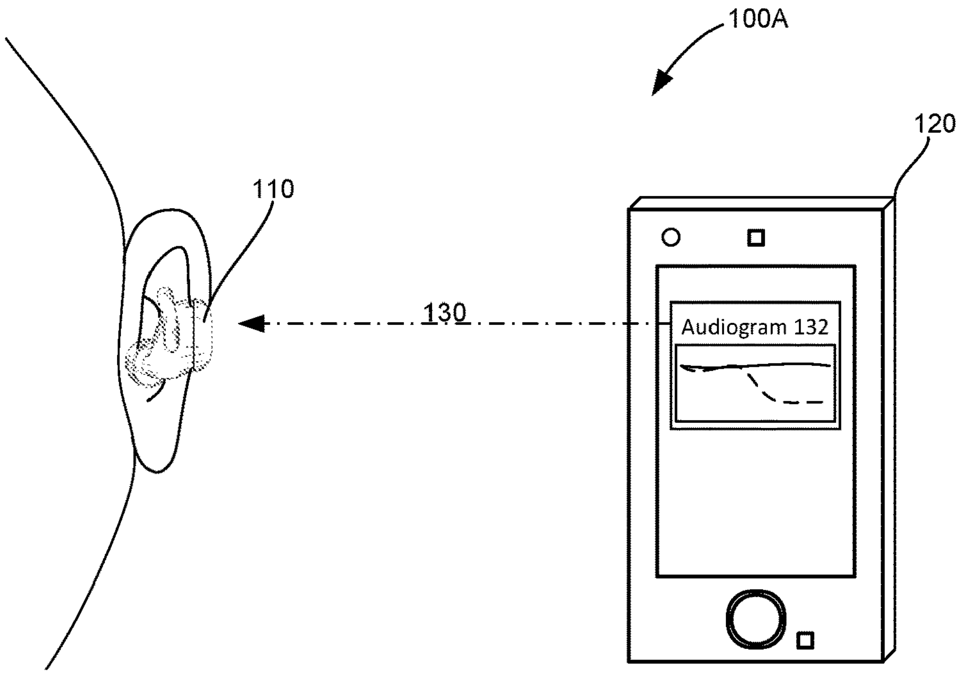
FIG. 1A is a pictorial diagram of an example device according to aspects of the disclosure.

FIG. 1A illustrates an example system 100A in which the features described herein may be implemented. It should not be considered limiting the scope of the disclosure or usefulness of the features described herein. In this example, system 100A may include a host device 120 and a wearable device 110. The host device 120 may be a smartphone and wearable device 110 may be a pair of earbuds. The host device 120 may be any device or accessory, such as smart phones, mobile phones, wireless-enabled PDAs, tablet PC, a netbook that is capable of obtaining information via the Internet or other networks, wearable computing devices (e.g., a smartwatch, headset, smartglasses, virtual reality player, other head-mounted display, etc.), wireless speakers, home assistants, gaming consoles, etc.

Host device 120 may be wirelessly connected 130 to wearable device 110. For example, host device 120 and wearable device 110 may be coupled via short-range communication, such as Bluetooth, Bluetooth low energy (BLE), etc. Wearable device 110 may receive content from host device 120 over the wireless connection 130. The content may be an audiogram 132 that is specific to a user. The content may also comprise music, speech or content from an audio source. The audiogram 132 may indicate certain frequencies at which the user may not be able to hear at the same intensity as other frequencies. The audiogram 132 illustrates as an example intensities measured in decibels over a frequency range. The audiogram 132 may include data pertaining to each ear of the user as one ear may have more hearing loss than the other. According to some examples, the content may be audio content to be output by the wearable device 110. For example, the host device 120 may be streaming audio content. The audio content may be transmitted to the wearable device 110 via wireless connection 130. The wearable device 110 may output the audio content for the user to hear.

Figure 1B:
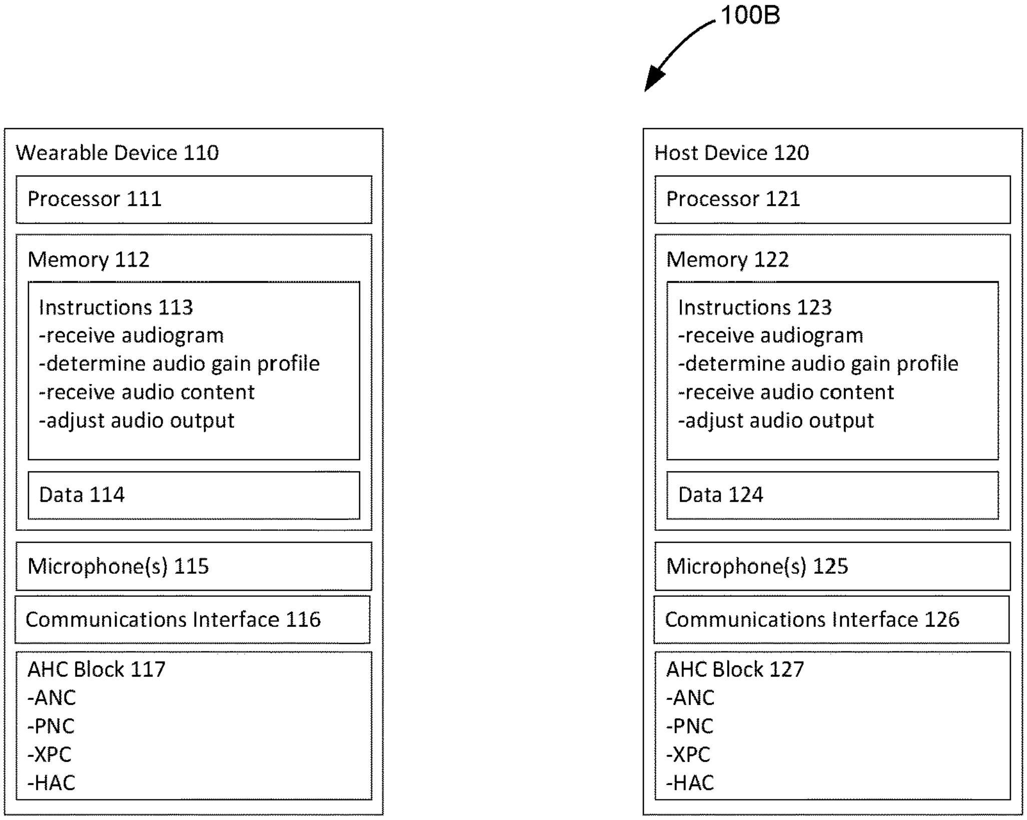
FIG. 1B is a functional block diagram of an example system in accordance with aspects of the disclosure.

FIG. 1B illustrates an example system 100B in which the features describe above and herein may be implemented. In this example, system 100B may include wearable device 110 and host device 120. Wearable device 110 may contain one or more processors 111, memory 112, instructions 113, data 114, one or more microphones 115, a wireless communication interface or antenna 116, and an adaptive hearing control ("AHC") block 117.

The one or more processors 111 may be any conventional processors, such as commercially available microprocessors. Alternatively, the one or more processors may be a dedicated device such as an application specific integrated circuit (ASIC) or other hardware-based processor. Although FIG. 1B functionally illustrates the processor, memory, and other elements of wearable device 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of wearable device 110. Accordingly, references to a processor or computing device will be understood to include references to a collection of processors or computing devices or memories that may or may not operate in parallel.

Memory 112 may store information that is accessible by the processors, including instructions 113 that may be executed by the processors 111, and data 114. The memory 112 may be a type of memory operative to store information accessible by the processors 111, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 113 and data 114 are stored on different types of media.

Memory 112 may be retrieved, stored or modified by processors 111 in accordance with the instructions 113. For instance, although the present disclosure is not limited by a particular data structure, the data 114 may be stored in computer registers, in a relational database as a table having a plurality of different fields and records, XML documents, or flat files. The data 114 may also be formatted in a computer-readable format such as, but not limited to, binary values, ASCII or Unicode. By further way of example only, the data 114 may be stored as bitmaps comprised of pixels that are stored in compressed or uncompressed, or various image formats (e.g., JPEG), vector-based formats (e.g., SVG) or computer instructions for drawing graphics. Moreover, the data 114 may comprise information sufficient to identify the relevant information, such as numbers, descriptive text, proprietary codes, pointers, references to data stored in other memories (including other network locations) or information that is used by a function to calculate the relevant data.

The instructions 113 can be any set of instructions to be executed directly, such as machine code, or indirectly, such as scripts, by the processor 111. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The wearable device 110 may include one or more microphones 115. The microphones 118 of wearable device may be located on a surface of the housing of wearable device 110 that is exposed when wearable device 110 is worn on the body. In some examples, the microphones 115 of wearable device 110 may be located on a surface of the housing of wearable device 110 that is in contact with the body when wearable device 110 is worn on the body. The microphones may be able to receive audio input. The audio input may processed by the AHC block based on the user's audio gain profile.

The wearable device 110 may further include a wireless communication interface 116, such as an antenna, transceiver, and any other devices used for wireless communication. The antenna may be, for example, a short-range wireless network antenna. The wearable device 110 may be able to be coupled with host device 120 via a wireless connection. For instance, the wireless communication interface 116 may be used to transmit and receive Bluetooth signals, WiFi signals or signals that use other short range wireless technologies.

The wearable device 110 may include an AHC block 117. The AHC 117 block may receive content, such as an audiogram, from the host device 120. The audiogram may indicate certain frequency ranges associated with hearing loss. The AHC block 117 may create an audio gain profile for the user based on the audiogram. The audio gain profile may indicate frequency ranges in which a positive and/or negative gain may be applied to provide the user with gain adjusted sound, which should provide a better listening experience. For example, for frequency ranges associated with hearing loss a positive gain may be applied to increase or enhance audio intensity in those frequency ranges. In frequency ranges that are not associated with hearing loss, or outside the normal expected hearing range of a human, a negative gain may be applied to decrease and/or lower audio in those frequency ranges.

The AHC block 117 may receive input from the microphones 115. For example, a first microphone may face externally, or be located on a surface that is exposed when the wearable device 110 is on the body of the user. The externally facing microphone may receive ambient or external noise as audio input. External noise may be noise that is happening around the user, such as traffic, construction, machines operating, indistinct chatter, etc. The AHC block 117 may receive input from a second microphone that is located on a surface that is configured to come in contact with the body when the wearable device 110 is on the body of the user. The second microphone may receive audio output by the wearable device. For example, the second microphone may receive as input what is the wearable device 110 is outputting to the user. In examples where the wearable device is a pair of earbuds, the second microphone 115 may be located on a surface that is within the ear of the user when the earbuds are on the body. There may be a propagation path around the earbuds. Based on the audio input received by each of the microphones 115 and the propagation path between the microphones 115, the AHC block 117 may determine what noise is ambient noise, what noise is intended for output to the user, etc. The AHC block 117 may adjust the audio output based on the audio gain profile and the received audio. In some examples, the AHC block 117 may output a set of noise control benefits to modify the way the audio is being perceived by the user.

The AHC block 117 may adjust the audio output using one or more adjustment modules. For example, the adjustment modules may include active noise control ("ANC"), transparency control ("XPC"), and/or hearing assistance control ("HAC"). These modules may comprise instructions that may be executed by processor 111 or may be implemented as integrated circuitry, e.g., an ASIC, a DSP residing on processor 111 or a portion of circuitry residing on processor 111. In some examples, the AHC block 117 may receive audio input received by the microphones 115. The AHC block 117 may process the audio input based on the audio gain profile. Adjusting the audio output may include applying a positive or negative gain to a certain frequency range. Each adjustment module may apply a different gain. For example, the HAC module may apply a positive gain while the ANC module applies a negative gain. The amount of gain may be different for each module and, in some examples, may depend on frequency of the audio. The amount of the gain may be determined using a least mean square algorithm and/or a machine learning model.

The AHC block 117 may include an ANC module to apply an ANC gain to the audio output. The ANC module may modify the output of certain frequencies depending on the user's audiogram. For example, the ANC module may isolate the audio output from the ambient or background noises. Ambient or background noises may be traffic, weather related noises such as wind and thunder, indistinct background chatter, the sound of the air-conditioner or heater, etc. Isolating the audio output may include creating a noise opposite the ambient or background noise such that the ambient or background noise is cancelled or substantially decreased. According to some examples, ANC may digitally cancel low frequency audio.

The AHC block 117 and, therefore, the ANC module may receive audio input from one or more microphones. The audio input may be ambient noise, background noise, etc. A sound estimate may be determined based on the received audio. The sound estimate may include an intensity, frequency, etc. of the received audio. Based on the sound estimate, the AHC block 117 may determine a gain to be applied such that the audio output provides a natural perfection of the ambient sounds. In some examples, the ANC module may create anti-noise or anti-sound corresponding to the ambient or background noise received by the one or more microphones. The anti-noise may have a sound wave, or frequency, opposite the undesired sound wave, or frequency, of the audio input. The anti-noise sound wave may cancel the sound wave of the audio input received by the one or more microphones.

The AHC block 117 may include an XPC module to apply an XPC gain to the audio output. The XPC may allow the user to maintain a comfortable playback volume while still being able hear ambient sounds. As described above and herein, the ANC module may reduce or cancel most or all of the background or ambient noise. To provide the user a more natural listening experience, the HAC module may modify or adapt the audio output using the XPC module to provide ambient noise as part of the audio output to the user. That is, while the ANC module may cancel the ambient noise, the XPC module may apply a gain to the received ambient noise such that the audio output is the same or similar to the user hearing the ambient noise without wearing the wearable device 110. The gain applied by the XPC module may be based on the audiogram. For example, the gain may be determined based on certain frequency ranges associated with hearing loss such that the user can hear the ambient noise as part of the audio output. This may provide the user a listening experience as if they user was not wearing the wearable device 110.

The AHC block 117 may include a HAC module. The HAC may apply a HAC gain to the audio input to modify the way the audio output is being perceived by the user. The HAC module may apply a positive gain to increase the intensity of certain frequencies or frequency ranges. For example, the audio gain profile may indicate that a user has hearing loss for a certain frequency range. The HAC module may apply a gain for audio within the identified frequency range. The amount of the gain may be based on the severity of hearing loss. By applying a positive gain, the intensity, or playback volume, may be increased. The inclusion of a HAC module may provide for a better user experience for users with mild to moderate hearing loss.

The wearable device 110 may be capable of passive noise control ("PNC") based on the materials used to manufacture the wearable device 110. For example, the materials of wearable device 110 may block out ambient or outside noises from being received by the user. In examples where the wearable device 110 is a pair of earbuds, the earpiece that fits within the user's ear may block or prevent sound from entering the ear. According to some examples, PNC may physically isolate high frequency audio input.

According to exome examples, the AHC block 117 may apply a least mean square algorithm to determine how to adjust the audio output using each adjustment module based on the audiogram. The LMS algorithm may use external microphone input and the processed output from the audiogram module to generate the desired filter gain response for the AHC block.

In some examples, the AHC block 117 may use a machine learning model to determine how to adjust the audio output using each adjustment module based on the audiogram. The machine learning model may be trained to determine the amount of gain to apply for each adjustment module. Each training example may consist of audio output provided to the user. The input features to the machine learning model may be the audiogram, volume commands received by the device to increase or decrease the playback volume, the ambient or background noise, etc. The machine learning model may use the input features to more accurately determine the amount of gain to be applied by each of the adjustment modules. The output of the machine learning model may be an amount of gain to be applied by each adjustment module of the AHC block 117. In some examples, the device may request feedback from the user. For example, the user may be asked whether the background noise was too loud or whether the audio output was too quiet. The user may provide feedback, such as a yes or no, indicating that the applied gains were appropriate for the user's listening preferences.

According to some examples the host device 120 and the wearable device 110 may be used to create an audiogram. The user may be periodically prompted by the host device 110 to participate in getting tested for an audiogram. The host device 120 may perform a hearing test when the user is wearing wearable device 110. The user may provide feedback during the test to create a new or updated audiogram. According to some examples, the machine learning model may use the new or updated audiogram as input to modify the audio gain profile. The updated audiogram may be used to dynamically adjust the audio gain profile. This may provide for continuous updates to the audio gain profile such that the audio gain applied by the AHC block 127 is based on the most up-to-date audiogram.

Host device 120 may each include one or more processors 121, memory 122, instructions 123, data 124, microphone(s) 125, wireless communication interface 126, and AHC block 127 that are substantially similar to those described herein with respect to wearable device 110.

Figure 2:
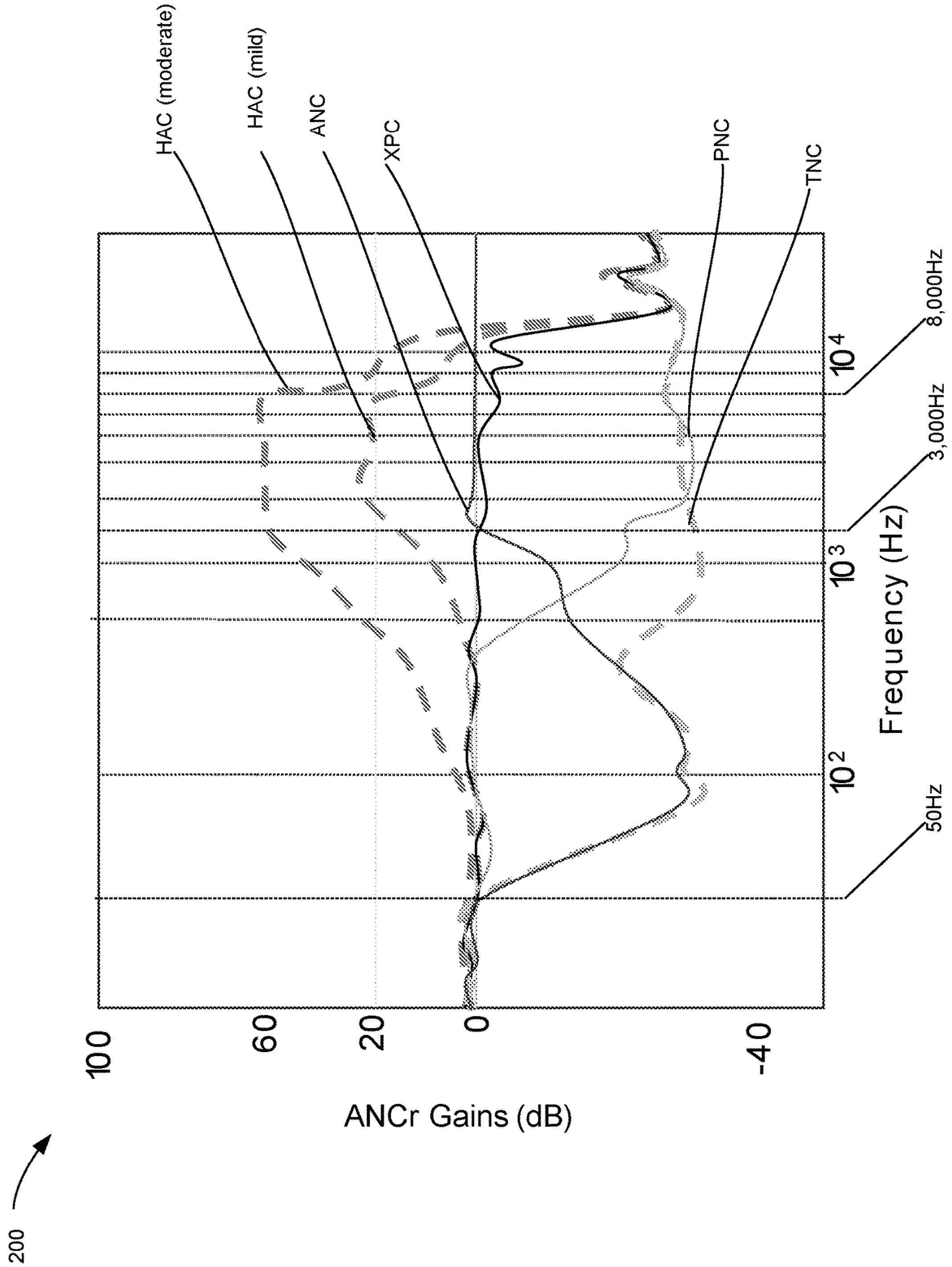
FIG. 2 is a graphical representation illustrating an example use according to aspects of the disclosure.

FIG. 2 illustrates a graphical representation of example audio gains applied by the AHC block based on an audio gain profile. Graph 200 illustrates gains that may be applied to the audio output by the adjustment modules based on the audio gain profile. In some examples, the AHC block may adjust the audio output based on parameters determined by a least mean square algorithm. For example, the least mean square algorithm may determine that the HAC module requires a larger grain in a certain frequency range than the ANC module in the same and/or different frequency range. The AHC block may apply positive and negative gains to certain frequency ranges using ANC, total noise cancellation ("TNC"), XPC, and HAC modules.

In the example shown in graph 200, the audiogram may indicate that the user has mild to moderate hearing loss for frequencies between approximately 3,000 Hz and 8,000 Hz. The audio gain profile may indicate that a positive gain may be applied by the HAC for frequencies between approximately 3,000 Hz and 8,000 Hz while a negative gain is applied by the ANC in other frequency ranges. This may allow for the user to better hear the audio output in the frequencies between 3,000 Hz and 8,000 Hz while blocking out other or unwanted audio in the frequencies outside of the 3,000 Hz to 8,000 Hz range.

The ANC module may apply a negative gain for frequencies other than those in the identified range of hearing loss. According to some examples, the ANC may be used to adjust the audio output heard by the user in frequency ranges in which the user does not have hearing loss. As shown in graph 200, the ANC may apply a negative gain for frequencies between approximately 50 Hz and approximately 3,000 Hz. For example, as the frequency of the audio increases from approximately 50 Hz to approximately 100 Hz, the ANC may gradually apply an increasing negative gain to cancel audio at those given frequencies. For example, audio having a frequency of approximately 75 Hz may require a gain of −20 dB to cancel or negate the audio. Audio having a frequency of approximately 90 Hz may require a gain of approximately −30 dB to cancel or negate the audio at that frequency.

Between approximately 100 Hz and 3,000 Hz the negative gain applied by the ANC may gradually decrease. For example, as the audio frequency approaches 3,000 Hz, the gain applied by the ANC may decrease from approximately −30 dB to approximately 0 dB.

As shown in graph 200, as the gain applied by the ANC module approaches 0 dB at approximately 3,000 Hz, the HAC module may apply a maximum gain of approximately 20 dB in examples where the user has mild hearing loss and approximately 60 dB in examples where the user has moderate hearing loss. According to the example shown in graph 200, the HAC module may apply a positive gain for frequencies between approximately 3,000 Hz and 8,000 Hz, or the frequencies associated with the user's hearing loss. The amount of gain applied may depend on the severity of the hearing loss. The severity of the hearing loss may be part of the audio gain profile based on the audiogram.

The PNC module may passively cancel noise due to the material and/or shape of the wearable device. In examples where the wearable device is a pair of earbuds, the portion of the earbud that is inserted into the user's ear may form a seal or a snug fit between the earbud and the user's ear. This may prevent outside or ambient noise from reaching the user's auditory system. The PNC module may work best at certain frequencies, based on the material of the wearable device. As shown, the PNC module may cancel audio have a frequency between approximately 1,000 Hz and above. According to some examples, the PNC module may be coming from the seal of the device when the device is powered off by the user.

The XPC module may apply a positive or negative gain to amplify or decrease the intensity of the ambient or background noise. This may allow the user to maintain a comfortable audio playback volume while still being able to hear ambient and/or background sounds. As shown in graph 200, the XPC module may not apply a positive or negative gain until the audio reaches a frequency of approximately 10,000 Hz. For example, the XPC module may not apply a gain to the audio received by the one or more microphones such that the audio output by the XPC module is the same or similar to the audio output that the user would hear without wearing the wearable device.

The TNC module may apply a negative gain across one or more frequency ranges. As shown in graph 200, the TNC module may apply a negative gain for frequencies greater than 50 Hz. The maximum negative gain applied by the TNC module may be in the frequency range associated with hearing loss. In this example, the maximum negative gain applied by the TNC module may be for audio having a frequency between 3,000 Hz and 10,000 Hz. According to some examples, the TNC module may be the combination of the PNC and ANC modules. For example, when the device switches to ANC mode, the noise cancellation benefit may be the total noise cancellation.

The AHC block may apply the gains determined by one more of the ANC, HAC, XPC, PNC, and TNC modules. In some examples, the amount of gain applied by the AHC block may be based on a least mean square algorithm, as described above. Additionally or alternatively, the amount of gain applied to adjust the audio output may be based on a machine learning model, also described above.

Figure 3:
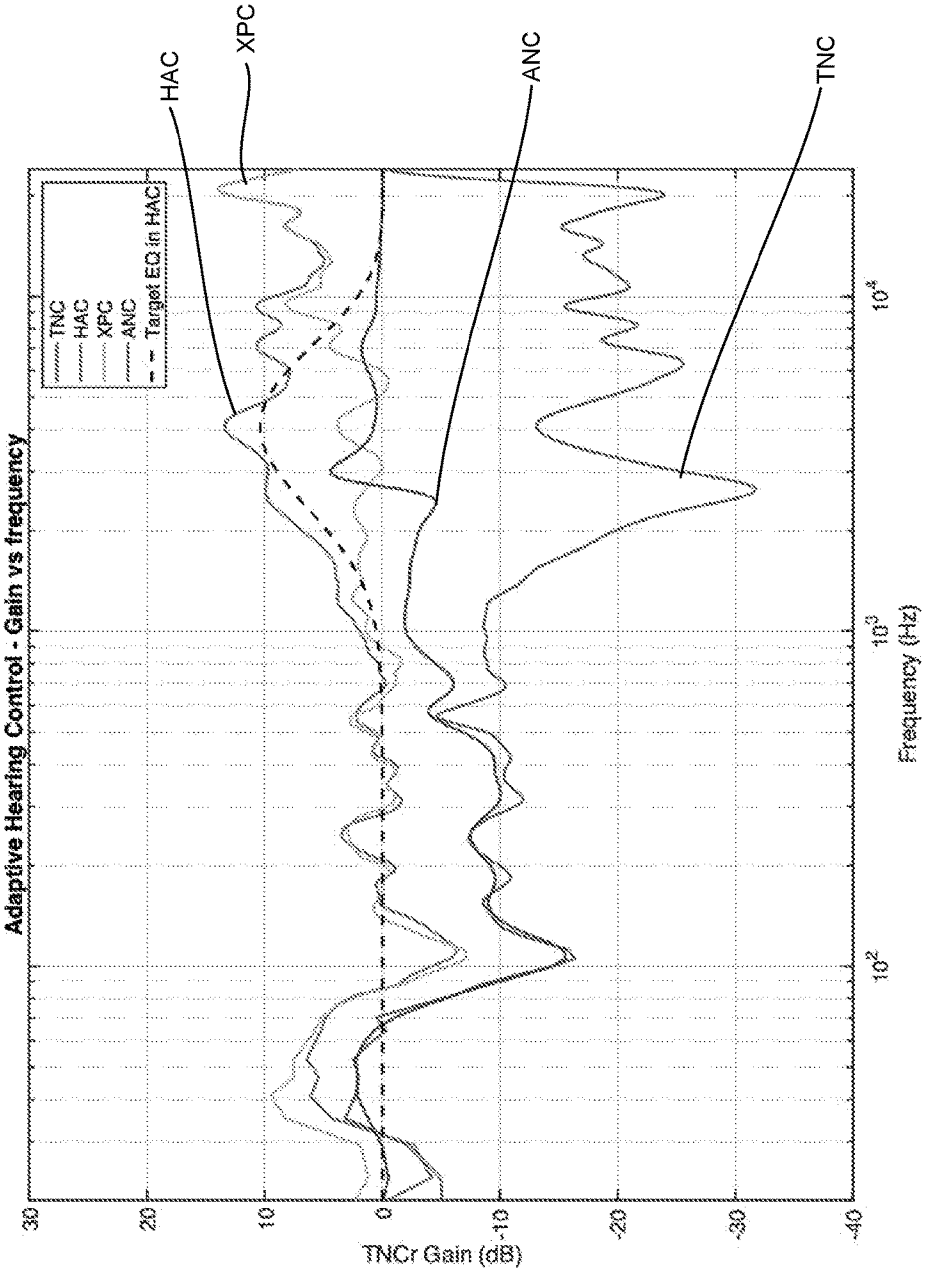
FIG. 3 is a graphical representation illustrating an example use according to aspects of the disclosure.

FIG. 3 illustrates a graphical representation of example audio gains applied by the AHC block based on another audio gain profile. The audio gains for each adjustment module may be based on the audio gain profile that was created for the user based on the received audiogram. For example, the audio gain profile may indicate that the user has mild to moderate hearing loss for frequencies above 2,000 Hz. As shown in graph 300, the HAC module may apply a positive gain to audio with a frequency above 2,000 Hz. The amount of the gain may be determined by the AHC block using a least mean square algorithm and/or a machine learning model.

The ANC module may apply a negative gain to audio having a frequency lower than 2,000 Hz. In some examples, the negative gain is applied to cancel or decrease the audio in certain frequency ranges. In this example, the negative gain is applied to cancel or decrease the audio having a frequency below 2,000 Hz. The amount of the gain may vary based on the audio and/or frequency. For example, background or ambient noise may be more likely to be canceled or decreased than playback audio, or audio the user is outputting through the wearable device. As shown in graph 300, the ANC module may apply a negative gain of approximately 15 Hz for audio having a frequency of approximately 100 Hz. In comparison, the ANC module may apply a negative gain of approximately 2 Hz for audio having a frequency of approximately 1,000 Hz. Thus, the amount of the gain may change based on the frequency of the audio.

The XPC module may apply a gain to the audio received by an external microphone in accordance to the audio gain profile. For example, the XPC module may apply a positive gain to audio input received by the external microphone having a frequency of less than 100 Hz. This may increase or intensify the ambient or background audio such that the user can hear the audio that user may not normally have been able to hear. As shown in graph 300, the XPC module may apply a positive gain to audio input received by the external microphone having a frequency greater than 10,000 Hz.

The HAC module may apply a gain to the audio received by the one or more microphones in accordance to the audio gain profile. For example, the audio gain profile may indicate or identify a frequency range associated with hearing loss. As shown in graph 300, the frequency range may be 2,000 Hz and 10,000 Hz. The HAC module may apply a positive gain to increase or amplify audio with a frequency between 2,000 Hz and 10,000 Hz. The positive gain may amplify the audio output for the frequency range associated with hearing loss to ensure that the user can hear the audio output in that frequency range.

The TNC module may apply a gain to the audio received by the one or more microphones in accordance to the audio gain profile. For example, the TNC module may apply a negative gain for one or more frequency ranges. The TNC module may apply a maximum negative gain in the frequency range associated with hearing loss.

Graph 300 may include a target equalization ("EQ") for the HAC module. The target EQ for the HAC module may be the target gains to be applied by the HAC module in the frequency range associated with hearing loss. For example, the target EQ may be a smooth curve, such as a convex curve, starting at or near the low frequency of the frequency range and ending at or near the high frequency of the frequency range. As shown, the curve may being at or near approximately 2,000 Hz and end at or near approximately 10,000 Hz. The curve may start at or near 2,000 Hz and form a smooth, upward curve indicating a gradual increase in applied gains until the gains reach a target maximum gain. After reaching the target maximum gain, the curve may form a smooth, downward curve indicating a gradual decrease in applied gains until the gains reach 0 dB. While the target EQ shows one example of what the target gains may be for the HAC module, the target is merely exemplary. The HAC module may apply gains larger or smaller than those shown by the target EQ.

Figure 4:
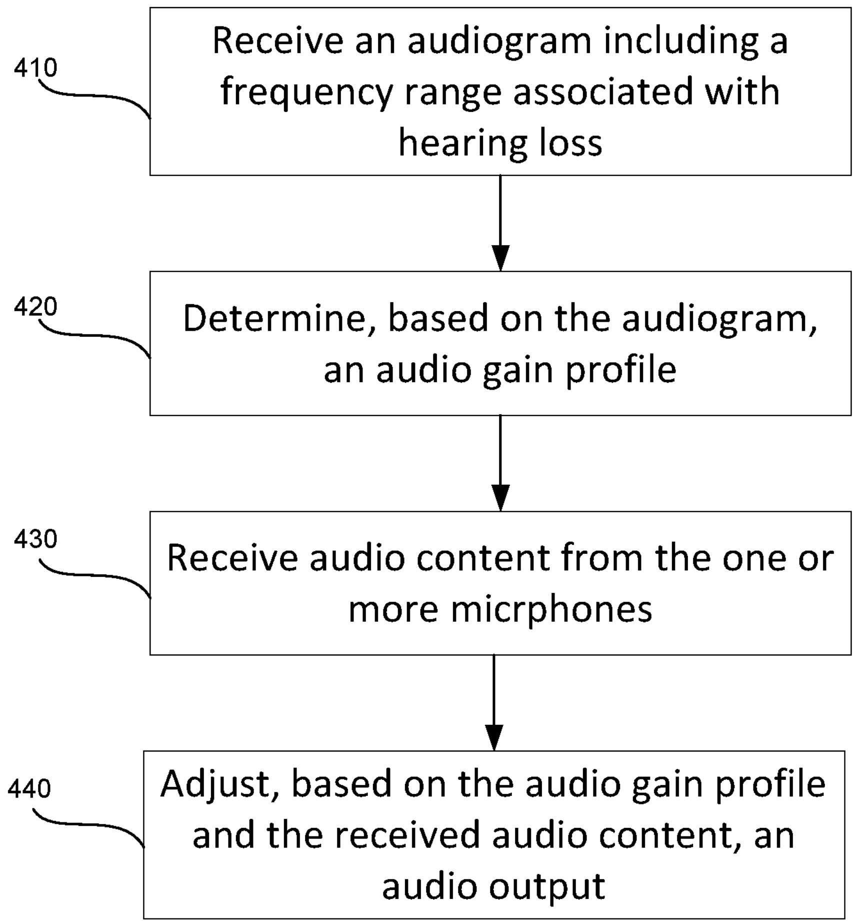
FIG. 4 is a flow diagram illustrating a method of adjusting an audio output according to aspects of the disclosure.

FIG. 4 illustrates an example method of adjusting an audio output of a wearable device based on an audio gain profile. The following operations do not have to be performed in the precise order described below. Rather, various operations can be handled in a different order or simultaneously, and operations may be added or omitted.

For example, in block 410 the wearable device may receive an audiogram including a frequency range associate with hearing loss. The audiogram may include a frequency range associated with hearing loss. The wearable device may be earbuds, smartglasses, AR/VR headsets, etc. The wearable device may be wirelessly connected to a host device. The host device may be, for example, a smartphone, tablet, laptop computer, etc. In some examples, the wearable device may receive audio content from the host device. The audio content may be output by the wearable device for the user to hear.

In block 420, the wearable device may determine, based on the audiogram, and audio gain profile. The audio gain profile may be based on the one or more frequencies in the audiogram and may include information identifying whether a positive or negative gain should be applied to the indicated frequencies.

In block 430, the wearable device may receive, from one or more microphones. The audio content may include external audio and/or playback audio. External audio may be audio that is received by a microphone on the exterior or outward facing surface of the wearable device. An exterior or outward facing surface may be a surface that is not configured to contact the body when the wearable device is worn on the body. Playback audio may be audio that is being output by the wearable device. For example, the host device may be streaming music to the wearable device. The wearable device may output the music for the user to hear. An internal or interior microphone may receive the playback audio. The internal or interior microphone may be a microphone on a surface of the wearable device that is configured to contact the body when the wearable device is worn on the body.

In block 440, the wearable device may adjust, based on the audio gain profile and the received audio content, an audio output. The device may use one or more adjustment modules to adjust the audio output. For example, the wearable device may include an AHC block comprising an ANC, HAC, TNC, PNC, and XPC module. Each module may determine a gain to be applied to the audio output based on the audio gain profile. For example, the ANC module may apply a gain to decrease or cancel external or ambient noise while the HAC module may apply a gain to increase audio within the frequency range associated with hearing loss.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements

The invention claimed is:

1. A wearable device, comprising:
- one or more microphones;
- one or more processors in communication with the one or more microphones, the one or more processors configured to:
  - receive an audiogram comprising at least one frequency associated with a hearing loss of a user;
  - determine, based on the audiogram, an audio gain profile;
  - receive audio content including at least one of external audio from the one or more microphones or playback audio; and
  - adjust an audio output, the adjustment:
    - based on the audio gain profile and the received audio content; and
    - performed using an adaptive hearing block, the adaptive hearing block comprising at least two adjustment modules from a set of two or more modules, the set of two or more modules comprising:
      - an active noise control module (ANC) configured to apply an ANC gain, the ANC gain determined by a machine-learned (ML) model;
      - a hearing assistance control module (HAC) configured to apply a HAC gain, the HAC gain determined by the ML model;
      - a total noise cancellation module (TNC) configured to apply a TNC gain, the TNC gain determined by the ML model;
      - a passive noise cancellation module (PNC); or
      - a transparency control module (XPC) configured to apply an XPC gain, the XPC gain determined by the ML model.

2. The wearable device of claim 1, wherein the audio gain profile includes a positive gain or a negative gain for at least one frequency range.

3. The wearable device of claim 1, wherein the audio gain profile includes at least one positive gain for the at least one frequency associated with the hearing loss of the user.

4. The wearable device of claim 1, wherein the audio gain profile is based on one or more frequency ranges in the audiogram.

5. The wearable device of claim 1, wherein when adjusting the audio output using the adaptive hearing block the one or more processors are further configured to determine, using a least mean square algorithm, a gain for the at least one frequency associated with the hearing loss of the user.

6. The wearable device of claim 1, wherein the one or more processors are further configured to:
- periodically receive one or more updated audiograms; and
- update the audio gain profile based on the one or more updated audiograms.

7. The wearable device of claim 1, wherein the ML model takes at least one of the audiogram, a user volume command, or an ambient audio signal as an input.

8. A method, comprising:
- receiving, by one or more processors, an audiogram comprising at least one frequency associated with a hearing loss of a user;
- determining, by the one or more processors based on the audiogram, an audio gain profile;
- receiving, from the one or more processors, audio content including at least one of external audio from one or more microphones in communication with the one or more processors or playback audio; and
- adjusting, by the one or more processors, an audio output, the adjustment:
  - based on the audio gain profile and the received audio content; and
  - performed using an adaptive hearing block, the adaptive hearing block comprising at least two adjustment modules from a set of two or more modules, the set of two or more modules comprising:
    - an active noise control module (ANC) configured to apply an ANC gain, the ANC gain determined by a machine-learned (ML) model;
    - a hearing assistance control module (HAC) configured to apply a HAC gain, the HAC gain determined by the ML model;
    - a total noise cancellation module (TNC) configured to apply a TNC gain, the TNC gain determined by the ML model;
    - a passive noise cancellation module (PNC), or
    - a transparency control module (XPC) configured to apply an XPC gain, the XPC gain determined by the ML model.

9. The method of claim 8, wherein the audio gain profile includes a positive gain or a negative gain for at least one frequency range.

10. The method of claim 8, wherein the audio gain profile includes at least one positive gain for the at least one frequency associated with the hearing loss of the user.

11. The method of claim 8, wherein the audio gain profile is based on one or more frequency ranges in the audiogram.

12. The method of claim 8, wherein when adjusting the audio output using the adaptive hearing block the one or more processors are further configured to determine, using a least mean square algorithm, a gain for the at least one frequency associated with the hearing loss of the user.

13. The method of claim 8, further comprising:
receiving, by the one or more processors, one or more updated audiograms; and
updating, by the one or more processors based on the one or more updated audiograms, the audio gain profile.

14. The method of claim 8, wherein the ML model takes at least one of the audiogram, a user volume command, or an ambient audio signal as an input.

15. A non-transitory computer-readable medium storing instructions, which when executed by one or more processors, cause the one or more processors to:
receive an audiogram at least one frequency associated with a hearing loss of a user;
determine, based on the audiogram, an audio gain profile;
receive audio content including at least one of external audio from one or more microphones or playback audio; and
adjust an audio output, the adjustment:
based on the audio gain profile and the received audio content;
performed using an adaptive hearing block, the adaptive hearing block comprising at least two adjustment modules from a set of two or more modules, the set of two or more modules comprising:
an active noise control module (ANC) configured to apply an ANC gain, the ANC gain determined by a machine-learned (ML) model;
a hearing assistance control module (HAC) configured to apply a HAC gain, the HAC gain determined by the ML model;
a total noise cancellation module (TNC) configured to apply a TNC gain, the TNC gain determined by the ML model;
a passive noise cancellation module (PNC), or
a transparency control module (XPC) configured to apply an XPC gain, the XPC gain determined by the ML model.

16. The non-transitory computer-readable medium of claim 15, wherein the audio gain profile includes a positive gain or a negative gain for at least one frequency range.

17. The non-transitory computer-readable medium of claim 15, wherein the audio gain profile includes at least one positive gain for the at least one frequency associated with the hearing loss of the user.

18. The non-transitory computer-readable medium of claim 15, wherein the audio gain profile is based on one or more frequency ranges in the audiogram.

19. The non-transitory computer-readable medium of claim 15, wherein the ML model takes at least one of the audiogram, a user volume command, or an ambient audio signal as an input.

20. The non-transitory computer-readable medium of claim 15, wherein when adjusting the audio output using the adaptive hearing block the instructions further cause the one or more processors to determine, using a least mean square algorithm, a gain for the at least one frequency associated with the hearing loss of the user.

* * * * *